United States Patent
Namekata et al.

(10) Patent No.: US 6,249,250 B1
(45) Date of Patent: Jun. 19, 2001

(54) ADAPTIVE VARIABLE DIRECTIONAL ANTENNA

(75) Inventors: Minoru Namekata, Kawasaki; Kazumi Sato, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/226,602

(22) Filed: Jan. 7, 1999

(30) Foreign Application Priority Data

Jan. 8, 1998 (JP) .................................................. 10-002659

(51) Int. Cl.$^7$ ....................................................... H01Q 3/26
(52) U.S. Cl. ................................................................. 342/372
(58) Field of Search ................................... 342/372, 368, 342/371

(56) References Cited

U.S. PATENT DOCUMENTS

| | | | |
|---|---|---|---|
| 5,867,478 | * | 2/1999 | Baum et al. .......................... 370/203 |
| 5,933,421 | * | 8/1999 | Alamouti et al. ..................... 370/330 |
| 5,973,642 | * | 10/1999 | Li et al. ................................ 342/378 |
| 5,995,483 | * | 11/1999 | Marchok et al. ..................... 370/207 |
| 6,087,986 | * | 7/2000 | Shoki et al. .......................... 342/383 |

\* cited by examiner

Primary Examiner—Thomas H. Tarcza
Assistant Examiner—Fred H. Mull
(74) Attorney, Agent, or Firm—Foley & Lardner

(57) ABSTRACT

An orthogonal frequency division multiplexing (OFDM) receiving signal from a plurality of antenna elements having identical characteristics is supplied to an excitation weight calculating part. An excitation weight is calculated for use in controlling excitation for each antenna element and each subcarrier based on the element intervals of the antenna elements and the frequency intervals of OFDM subcarriers. A receiving signal from the antenna elements is assigned the calculated excitation weight by an excitation weight assigning part. Thus, the optimum array pattern is obtained in a desired direction in all bands of the OFDM signal, thereby realizing the transmission and reception without an influence of interference waves.

21 Claims, 10 Drawing Sheets

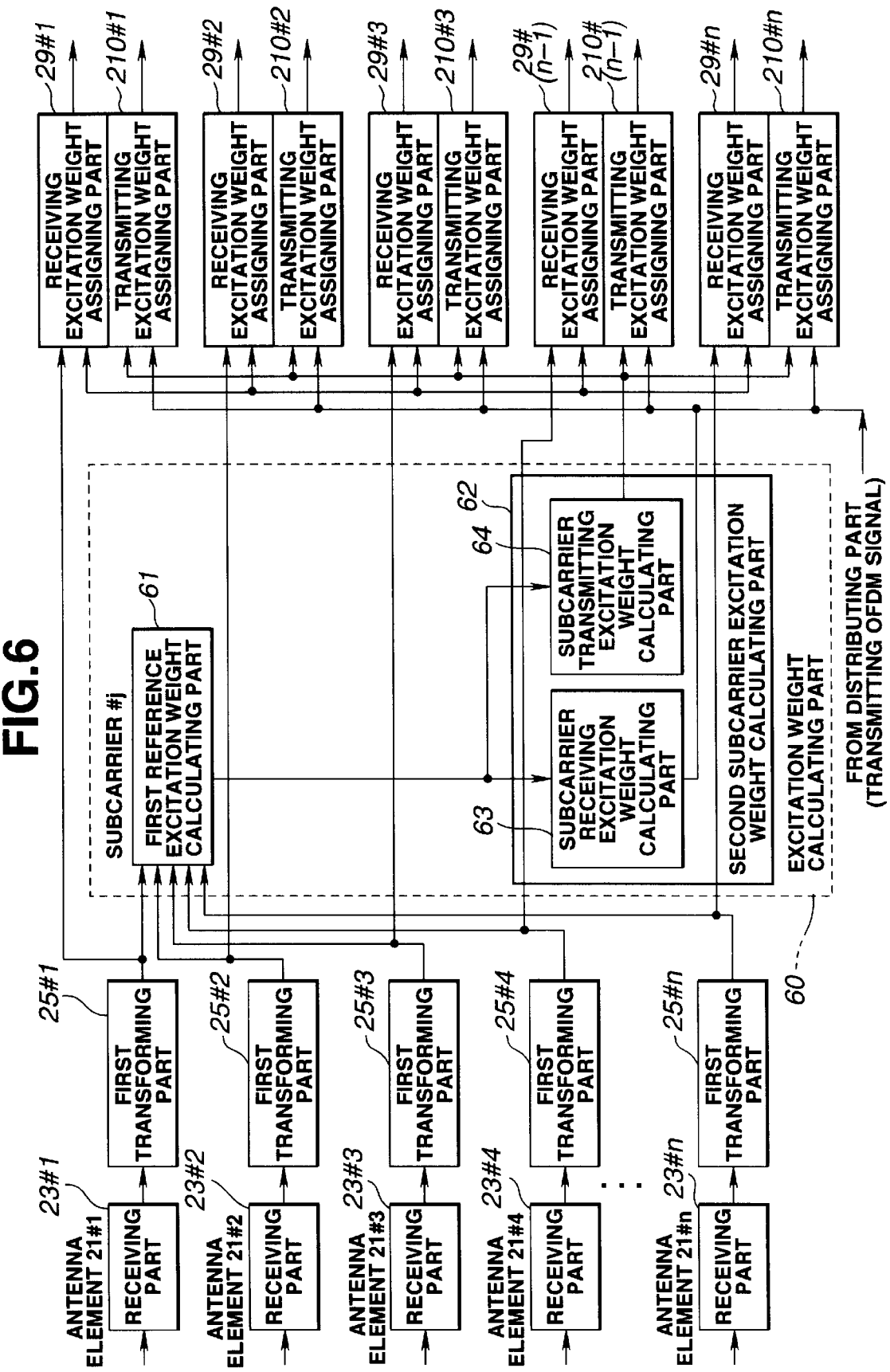

FIG.11

● COMMUNICATION AND BROADCASTING
  SYSTEM ATTENUATION (dB) EXAMPLE

| ELEMENT INTERVALS | ARRIVAL ANGLE | COMMUNICATION | | | BROADCAST | | |
|---|---|---|---|---|---|---|---|
| | | 4 | 8 | 16 | 4 | 8 | 16 |
| 0.5λ | 30 DEGREES | 0.00 | 0.00 | 0.00 | 0.01 | 0.05 | 0.18 |
| | 45 DEGREES | 0.00 | 0.00 | 0.00 | 0.02 | 0.09 | 0.37 |
| | 60 DEGREES | 0.00 | 0.00 | 0.00 | 0.03 | 0.14 | 0.56 |
| 0.8λ | 30 DEGREES | 0.00 | 0.00 | 0.00 | 0.03 | 0.12 | 0.48 |
| | 45 DEGREES | 0.00 | 0.00 | 0.00 | 0.06 | 0.23 | 0.98 |
| | 60 DEGREES | 0.00 | 0.00 | 0.00 | 0.08 | 0.35 | 1.50 |
| 1.0λ | 30 DEGREES | 0.00 | 0.00 | 0.01 | 0.04 | 0.18 | 0.76 |
| | 45 DEGREES | 0.00 | 0.00 | 0.01 | 0.09 | 0.33 | 1.57 |
| | 60 DEGREES | 0.00 | 0.01 | 0.02 | 0.13 | 0.55 | 2.46 |

ADAPTIVE VARIABLE DIRECTIONAL ANTENNA

BACKGROUND OF THE INVENTION

1. Field of the Invention

The present invention relates to an adaptive variable directional antenna suitable for a radio communication system that performs a radio transmission of a digital signal sequence using an orthogonal frequency division multiplexing (OFDM) system.

2. Description of the Related Art

Recently, an information communication system by a digital radio system has attracted much attention. For example, developing advanced digital radio transmission technology is required to realize such as a digital TV broadcasting service using a terrestrial currently operated in the analog system, and a digital multimedia service for the next generation.

In the portable telephone service of the current digital system, transmitted information is low-speed data represented by voice. Therefore, the service is not easily affected by a radio wave propagation environment. On the other hand, with the terrestrial TV broadcasting services and the multimedia communications of the next generation, transmitted information contains a large volume of image data. Therefore, a high radio frequency (high frequency) and a high transmission rate (broad-band) are required to realize these broadcasting services and multimedia communications. A high frequency is subject to deterioration of reception characteristic by fading, thereby causing inferior mobility of the terminal and receiving stations. In addition, a broad band is subject to deterioration of reception characteristic by a multipath (multi-hop transmission), thereby causing difficulty in securing a transmission distance for the terminal and receiving stations as in the case of fading.

Since the service area to be covered by a single broadcasting station is quite large in the terrestrial TV broadcasting service, a receiving image is subject to deterioration by a multipath. Since the scale of the multipath is much larger than the scale of the multipath generated by the above described portable telephone, it is impossible to attain the purpose without employing anti-multipath technology. Normally, an adaptive equalizer is used for anti-multipath technology. However, since the size of a device becomes large with the amount of a multipath corresponding to the size of the device, it has the problem of the mobility and portability of the receiving station which receives data being in a mobile state which can be largely deteriorated.

The multimedia communication system of the next generation aims at seamlessly processing all digitized information such as voice, images, and data and presenting it to the users. Additionally, unlike a TV broadcasting service, different information is required for each user, and therefore, a high-speed radio transmission (broadband radio transmission) should be realized in a small-zone configuration.

Since this system is designed in a small-zone structure, such a grave multipath propagation distortion as in the terrestrial TV broadcasting service is not generated. However, the distortion cannot be completely ignored because the system is established in broadband communication. Furthermore, on condition that it is to be realized that the system is in a zone structure, the frequency utilization should be improved for repetitive use of a frequency, thereby requiring a unit for attenuating the Co-channel interference. However, as in the above described broadcasting system, there is a problem that the mobility and the portability of a receiving terminal station can deteriorate.

As described above, in the radio broadcasting system and radio communication system that hopefully will be realized in the digital system, the most important subject is to realize the broadband communications with the anti-multipath measures and the anti-fading measures taken into account. An orthogonal frequency division multiplexing (OFDM) transmission system capable of transmitting high-quality information with good stability even in a poor multipath propagation environment is regarded with increasing expectation, thereby causing a tendency to employ it for a terrestrial TV broadcasting service and next generation multimedia communications in Japan as well as in Europe.

In the OFDM transmission system referred to as an ultimate multicarrier transmission system, a part of the transmitting signal is duplicated for a guard period as redundancy. The guard period absorbs the multipath propagation following it, thereby preventing grave deterioration. However, the anti-multipath propagation characteristic of the OFDM is not sufficient to successfully avoid deterioration of reception characteristic by the severe frequency selection fading generated by the multipath propagation.

Particularly, in the high-quality image high-definition image) and data transmission expected in the future digital terrestrial TV broadcasting service and the next generation multimedia communications, a transmission should be much higher in quality (lower bit error rate) than in the voice communications. That is, a transmission unit is required to realize much better transmission characteristics. Since the OFDM transmission system is not so stable against the fading generated by a mobile receiving station and a terminal station, or against the Co-channel interference although it has a much better multipath characteristic, it is necessary to find an appropriate method for preventing the above described distortion.

Recently, an adaptive variable directional antenna (adaptive array antenna) is often used as a unit for attenuating the multipath interference, the Co-channel interference, and the fading. The adaptive variable directional antenna is designed to select the direction in space for receiving a radio wave. It can receive only the desired radio wave as long as radio waves (multipath waves and/or common frequency waves) do not arrive as interference from the same direction.

The adaptive variable directional antenna generates an antenna directional beam in a desired radio wave arrival direction by arranging a plurality of antenna elements having the identical characteristics at intervals shorter than the wavelength of radio frequency used for communications in a predetermined array (in weighted linear form, weighted circular form, weighted polygonal form, etc.), and by exciting each antenna element with an appropriate excitation weight, thereby successfully producing an antenna directional null in the unnecessary radio wave arrival direction. Therefore, using an adaptive variable directional antenna, a system resistant to multipath interference and Co-channel interference can be designed.

However, the adaptive variable directional antenna is designed depending on the radio frequency (wavelength) used for communications, and a generated directional pattern (directional beam and directional null) is effective only for a specific radio frequency. Therefore, when the adaptive variable directional antenna is employed for broadband communications, a desired directional pattern cannot be generated for all signal components (frequency components) in the band, thus failing in establishing an effective antimultipath system.

Especially, an OFDM signal is a broadband signal having tens to thousands of subcarriers. Therefore, even if the adaptive variable directional antenna is used for the OFDM transmission system, only specific subcarriers in a large number of subcarriers can have effective directional pattern, and the other subcarriers have directional patterns ineffective in multipath interference. In the above described situation, an adaptive variable directional antenna, which is effective especially in all communication bands in the OFDM transmission system, is demanded for extremely broad band communications from several to tens MHz in the digital terrestrial TV broadcasting service and the next generation multimedia service to be practically realized in the near future.

Thus, in the next generation multimedia communication systems or terrestrial TV broadcasting systems in which a digital signal sequence is transmitted in the orthogonal frequency division multiplexing (OFDM) system, the anti-multipath propagation characteristic of the OFDM transmission system should be effectively used while attenuating the arrival of multipath interference waves. In addition, the adaptive variable directional antenna is also required to attenuate the arrival of Co-channel interference waves which cause trouble in a cell-domain communication system, and to perform space control of a broadband transmitting/receiving OFDM signal waves.

Particularly, there has been a problem of adaptive variable directional antenna having only one excitation weight for a signal wave with a band width which cannot be in an antenna directivity in the direction in which control should be performed for all frequency components in the OFDM transmission band, thereby failing to produce an antenna directivity effective for all frequency components of received broadband waves.

OBJECTS AND SUMMARY OF THE INVENTION

It is an object of the present invention to provide an adaptive variable directional antenna capable of having uniform directional control over all frequency components in the band of broadband transmitting signals.

It is another object of the present invention to provide an adaptive variable directional antenna capable of transmitting and receiving signals with little disturbance by interference waves when a broadband signal is transmitted by obtaining an antenna directional beam effective for all frequency components in the band of broadband transmitting signals.

An adaptive variable directional antenna according to the present invention comprises a plurality of identical characteristic antenna elements for use in transmitting and receiving an OFDM signal; an excitation weight calculating part for calculating an excitation weight capable of having excitation control on the plurality of antenna elements for each antenna and each subcarrier at intervals of a plurality of antenna elements and at intervals of the frequency of the subcarriers of the OFDM signal; and an excitation weight assigning part for assigning an excitation weight calculated by the excitation weight calculating part to the OFDM signals received by the plurality of antenna elements or the OFDM signals transmitted through the plurality of antenna elements.

Other features and advantages of the present invention will be apparent from the following description of the embodiments of the invention.

BRIEF DESCRIPTION OF THE DRAWINGS

FIG. 6 is a block diagram showing a further embodiment of the present invention;

FIG. 11 is a table for explaining an embodiment of the present invention.

DETAILED DESCRIPTION OF THE PREFERRED EMBODIMENTS

Figure 1:
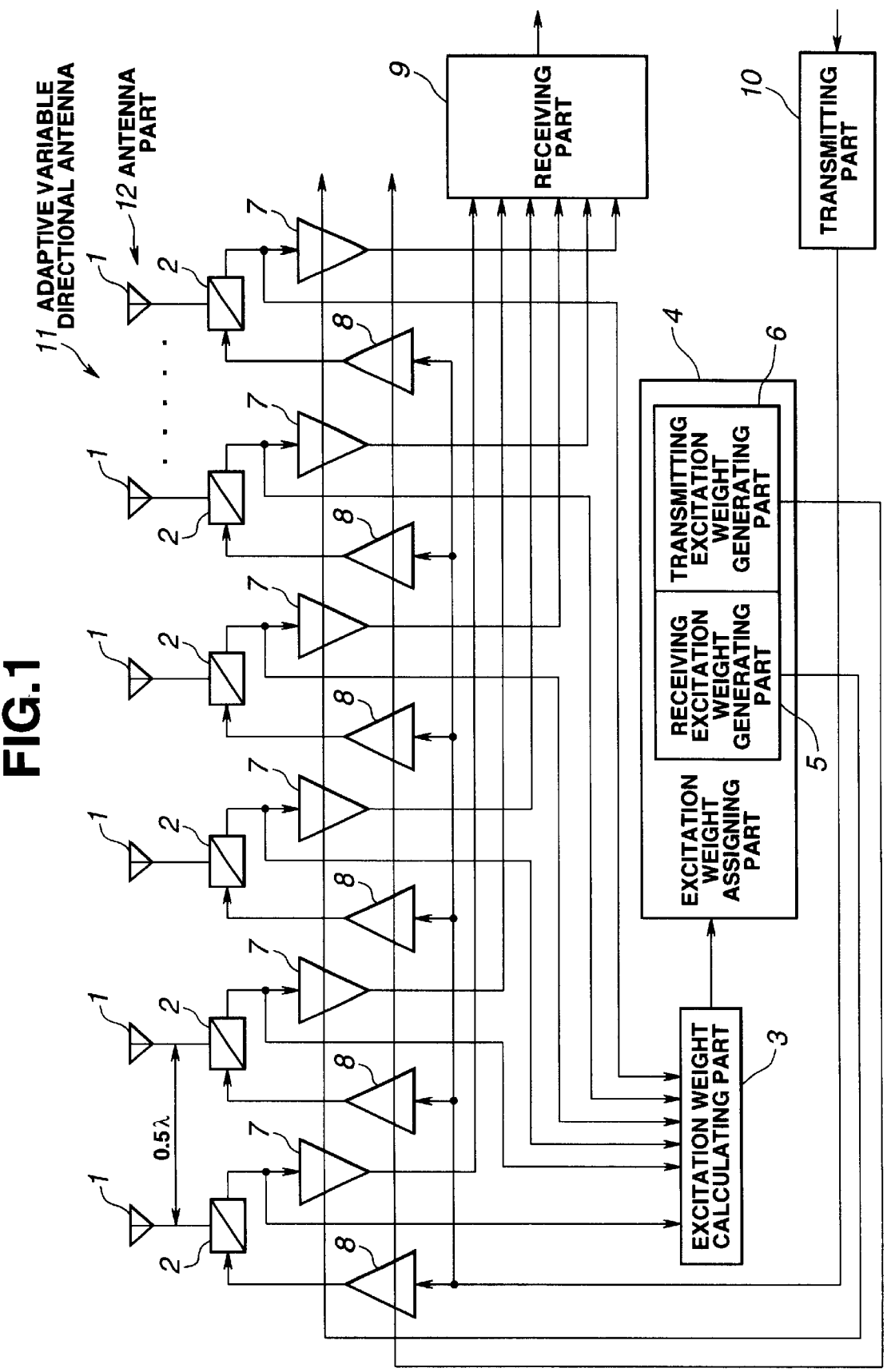
FIG. 1 is a block diagram showing an embodiment of an adaptive variable directional antenna according to the present invention.

The embodiments of the present invention are described below in detail with reference to the accompanying drawings. FIG. 1 is a block diagram showing an embodiment of an adaptive variable directional antenna according to the present invention. The present embodiment can be applied to an antenna for transmitting and receiving, for example, an OFDM signal.

An analog transmitter/receiver required in the configuration of an actual receiver and transmitter is not shown in FIG. 1.

In FIG. 1, for example, an adaptive variable directional antenna 11 for transmitting/receiving an OFDM signal comprises an antenna part 12 having a plurality of antenna elements 1 having identical characteristics; a duplexer or switch 2 for demultiplexing a transmitting/receiving signal; an excitation weight calculating part 3; an excitation weight assigning part 4; a receiving excitation weight assigning part 7; a transmitting excitation weight assigning part 8; a receiving part 9, and a transmitting part 10.

The antenna part 12 comprises a plurality of antenna elements 1 having identical characteristics arranged at intervals (normally 0.5 wavelength) shorter than the wavelength of a radio frequency. The intervals of the plurality of antenna elements 1 having the identical characteristics depend on the radio frequency. An OFDM receiving signal received by the antenna part 12 is input to the excitation weight calculating part 3 through the duplexer or RF switch 2 to prevent its mixing with an OFDM transmitting signal.

The excitation weight calculating part 3 predicts the direction for receiving an OFDM receiving signal based on the intervals of the antenna elements 1 and the frequency intervals of the OFDM subcarriers, and calculates the excitation weight for generating an optimum receiving antenna pattern. The OFDM signal is designed to transmit information through a plurality of subcarriers orthogonal to each other, and separates a receiving signal into a spectrum. Thus, an excitation weight can be calculated to have excitation control of each antenna and each subcarrier. That is, since the excitation weight is determined based on the element intervals and the frequency intervals of the OFDM subcarriers, a directional pattern effective for each subcarrier can be generated for each antenna.

The excitation weight calculated by the excitation weight calculating part 3 is used for reception because it is calculated from an OFDM receiving signal. However, it can be used for transmission when it is transmitted through a time division multiplexing system using identical frequencies. In addition, in a frequency division multiplexing system, a correction is made to the transmitting excitation weight in consideration of the difference between the receiving frequency and the transmitting frequency.

The excitation weight assigning part 4 comprises a receiving excitation weight generating part 5 and a transmitting excitation weight generating part 6. The receiving excitation weight generating part 5 generates a receiving excitation weight based on the calculation of the excitation weight calculating part 3, and supplies the generated receiving excitation weight to the receiving excitation weight assigning part 7. The receiving excitation weight assigning part 7 assigns the receiving excitation weight to the OFDM receiving signal received by the antenna element 1 having identical characteristics and input through the duplexer or RF switch 2, and supplies the signal to the receiving part 9.

A receiving excitation weight can be assigned to an OFDM receiving signal through a time waveform or a frequency spectrum. That is, when an excitation weight is assigned in a time waveform, the excitation weight is calculated in the form of a time waveform. When an excitation weight is assigned in a frequency spectrum, the excitation weight is calculated in the form of an excitation spectrum. The receiving part 9 demodulates the input OFDM receiving signal, and supplies the demodulated output.

In the transmitting system, transmission data is input to a transmitting part 10. The transmitting part 10 performs a signal process such as a predetermined modulating process on the transmission data, and obtains an OFDM transmitting signal. The OFDM transmitting signal is supplied to the transmitting excitation weight assigning part 8. The transmitting excitation weight generating part 6 of the excitation weight assigning part 4 generates a transmitting excitation weight to be assigned to the OFDM transmitting signal, and supplies it to the transmitting excitation weight assigning part 8.

The transmitting excitation weight assigning part 8 assigns the transmitting excitation weight from the transmitting excitation weight generating part 6 to the OFDM transmitting signal, and supplies it to the A plurality of antenna elements 1 having identical characteristics through the duplexer or RF switch 2. The antenna element 1 raises excitation based on the provided OFDM transmitting signal, and emits the transmitting signal in space.

The transmitting excitation weight can be assigned to the OFDM transmitting signal through either a time waveform or a frequency spectrum as in the receiving system.

Described below is an operation according to the embodiment configured as described above.

Assuming that an OFDM signal is received. A signal excited in each antenna element 1 of the antenna part 12 is supplied to the excitation weight calculating part 3 through the duplexer or RF switch 2. The excitation weight calculating part 3 predicts the direction for receiving an OFDM receiving signal based on the intervals of the antenna elements 1 and the frequency intervals of the OFDM subcarriers, and calculates the excitation weight for generating an optimum receiving antenna pattern.

The result obtained by the excitation weight calculating part 3 is supplied to the excitation weight assigning part 4. The receiving excitation weight generating part 5 of the excitation weight assigning part 4 generates an excitation weight to be assigned to a signal from each antenna element 1 based on the calculation result of the excitation weight calculating part 3, and supplies it to the receiving excitation weight assigning part 7 corresponding to each antenna element 1.

Thus, a receiving signal from each antenna element 1 is assigned a receiving excitation weight by the receiving excitation weight assigning part 7. As a result, each antenna element 1 of the antenna part 12 can form the optimum directional pattern for all subcarriers, that is, form an antenna directional beam in the desired wave arrival direction and form an antenna directional null in the unnecessary wave arrival direction, thereby receiving data with little multipath interference and Co-channel interference.

A receiving signal from the receiving excitation weight assigning part 7 is supplied to the receiving part 9 and then demodulated.

In the transmission of data, a transmitting signal is modulated in the transmitting part 10 and supplied to the transmitting excitation weight assigning part 8 corresponding to each antenna element 1. The transmitting excitation weight generating part 6 of the excitation weight assignment part 4 generates a transmitting excitation weight for use in setting each antenna element 1 with an optimum directional pattern in all bands of each antenna element 1.

The transmitting excitation weight is supplied to the transmitting excitation weight assigning part 8 corresponding to each antenna element 1, and assigned to a transmitting signal. The transmitting signal from the transmitting excitation weight assigning part 8 is supplied to each antenna element 1 through the duplexer or RF switch 2. Thus, the antenna element 1 is excited and the transmitting signal is emitted.

Thus, a transmitting signal which is assigned an excitation weight corresponding to all bands is supplied to each antenna element 1, and each antenna element 1 generates a common optimum directional pattern in all bands.

Thus, since an excitation weight is determined based on the intervals of antenna elements and the frequency intervals of OFDM subcarriers according to the present embodiment, the antenna directivity can be uniformly controlled for all frequency components in the band of the OFDM transmitting/receiving signals. Therefore, even in the radio wave propagation environment in which interference waves such as a multipath, fading, Co-channel interference arrive, an OFDM signal wave of a broad band can be transmitted and received without much disturbance from interference waves. Particularly, a broadband OFDM signal wave, which has never been realized with the conventional adaptive variable directional antenna, can be transmitted/received in space. As a result, a radio communication system or a radio broadcasting system, which has an improved reception characteristic (communication quality) and has less interference, can be successfully established.

Figure 2:
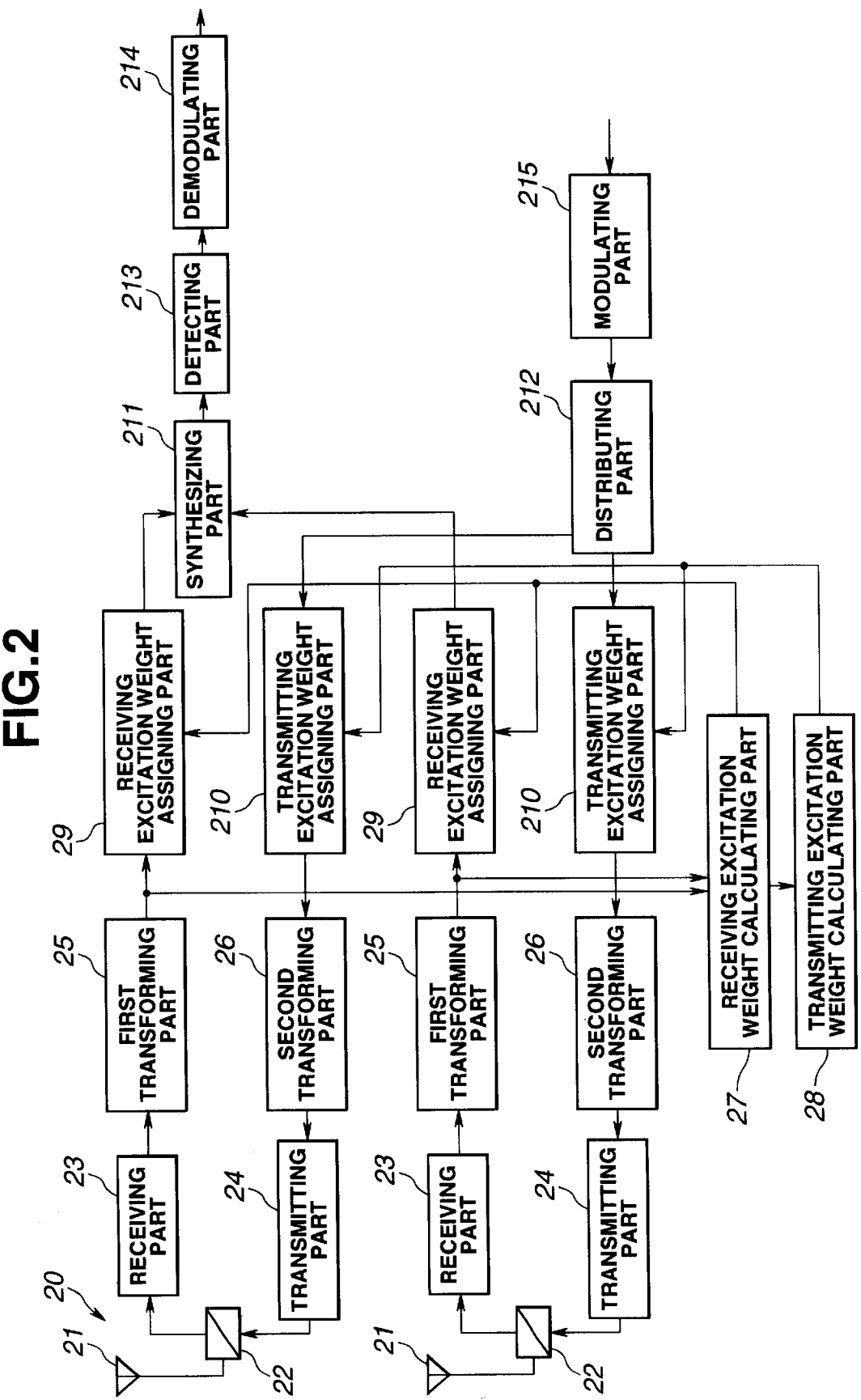
FIG. 2 is a block diagram showing another embodiment of the present invention.

FIG. 2 is a block diagram showing another embodiment of the present invention. The present embodiment shows practical processing blocks by which the present invention can be realized as a device. The present embodiment is an example of applying the assignment of an excitation weight to an OFDM transmitting/receiving signal using a frequency spectrum (frequency axis). In FIG. 2, there are two antenna elements having the identical characteristics. However, the number of antenna elements is not limited to 2, but it is obvious that it can be any number equal to or larger than 2.

An antenna 20 normally comprises a plurality of antenna elements 21 having identical characteristics. The intervals of the antenna elements 21 are shorter than the wavelength of the radio frequency (normally about 0.5 wavelength). The OFDM receiving signal received by the antenna elements 21 is input to a receiving part 23 through a duplexer or RF switch 22 supplied to demultiplex the transmitting signal from the receiving signal. The duplexer or RF switch 22 has the same configuration as the duplexer or RF switch 2 shown in FIG. 1.

In the receiving system, the receiving part 23 converts an OFDM receiving signal into a base band digital signal by performing various processes such as an amplifying process, a band limiting process, a frequency converting process, and an AD converting process. Furthermore, the receiving part 23 performs a frequency offset removing process, a synchronizing process, a guard removing process, and the like. The output from the receiving part 23 is supplied to a first transforming part 25. The first transforming part 25 converts an input signal into each frequency spectrum signal by performing a fast Foulier transform or the like on the input signal, and then supplies the converted signal to a receiving excitation weight assigning part 29 and a receiving excitation weight calculating part 27.

The receiving excitation weight calculating part 27 calculates a receiving excitation weight based on the distance between the plurality of antenna elements 21 having identical characteristics depending on the radio frequency, and on the frequency intervals of OFDM subcarriers. The receiving excitation weight is calculated for each antenna element and for each receiving OFDM subcarrier.

The calculated receiving excitation weight is supplied to the receiving excitation weight assigning part 29 corresponding to each antenna element 21. The receiving excitation weight assigning part 29 assigns a receiving excitation weight for each frequency spectrum from the first transforming part 25, and supplies the result to a combining part 211. That is, the receiving excitation weight assigning part 29 assigns the excitation weight to each antenna element and to each receiving OFDM subcarrier.

The synthesizing part 211 synthesizes an OFDM signal assigned a receiving excitation weight by the receiving excitation weight assigning part 29 which assigns a different receiving excitation weight for each receiving OFDM subcarrier. Thus, a signal element (such as a delayed wave component or interference wave component) other than an OFDM signal arriving from a desired direction can be suppressed.

The output from the synthesizing part 211 is supplied to a detecting part 213. The detecting part 213 performs a detecting process according to the modulation performed on the OFDM subcarrier, and supplies the result to a demodulating part 214. The demodulating part 214 demodulates the output of the detecting part 213 into the signal sequence (bit sequence) for output.

On the other hand, in the transmitting system, a digital signal sequence (bit sequence) to be transmitted to a modulating part 215 is input. The modulating part 215 modulates the input digital signal sequence (bit sequence) into an OFDM subcarrier by a predetermined modulation system. The modulated OFDM transmitting signal is supplied to a distributing part 212. The distributing part 212 distributes the OFDM transmitting signal equally to each antenna elements 21, and supplies the signal to a transmitting excitation weight assigning part 210 corresponding to each antenna elements 21.

A transmitting excitation weight calculating part 28 calculates a transmitting excitation weight to be assigned to a transmitting signal based on the receiving excitation weight calculated by the receiving excitation weight calculating part 27. When a time division multiplexing (TDD) system is employed, the same transmitting/receiving radio frequency is used, and therefore, the transmitting excitation weight calculating part 28 generates the transmitting excitation weight which is the same as the receiving excitation weight. When a frequency division multiplexing (FDD) system is employed, the transmitting excitation weight calculating part 28 calculates, as the transmitting excitation weight, the result obtained by performing a correcting process on the receiving excitation weight based on the difference between the receiving radio frequency and the transmitting radio frequency.

The transmitting excitation weight assigning part 210 assigns a transmitting excitation weight for transmission in a desired direction to the output from the distributing part 212, and supplies the result to a second transforming part 26.

The second transforming part 26 converts the input frequency spectrum signal into a time waveform by performing an inverse Fourier transform or the like, and supplies the result to a transmitting part 24. The transmitting part 24 performs a guard adding process and a DA converting process on the input OFDM transmitting signal. Further it performs various processes required for transmission such as a frequency converting process, amplifying process, and band limiting process, and supplies the resultant signal to the duplexer or RF switch 22.

The duplexer or RF switch 22 supplies the input OFDM transmitting signal to each antenna element 21. The antenna element 21 raises excitation based on the OFDM transmitting signal, and emits the transmitting signal in space.

Described below is the operation of the embodiment with the above described configuration.

In the receiving operation, the OFDM receiving signal received by the antenna element 21 is supplied to the receiving part 23 through the duplexer or RF switch 22. The receiving part 23 converts the OFDM receiving signal into a base band digital signal, and then the first transforming part 25 converts the signal into a frequency spectrum signal in a fast Fourier transform (FIFT) process.

In the present embodiment, an excitation weight is assigned in the state of a frequency spectrum. The receiving excitation weight calculating part 27 calculates the receiving excitation weight based on the distance between elements depending on the radio frequency and the frequency intervals of the OFDM subcarriers. The receiving excitation weight calculating part 27 calculates the excitation weight for each antenna element and each subcarrier, and supplies the calculated excitation weight to the corresponding receiving excitation weight assigning part 29.

Thus, the receiving excitation weight assigning part 29 corresponding to each antenna element 21 assigns an excitation weight corresponding to each antenna element from the first transforming part 25. The output from each receiving excitation weight assigning part 29 is processed by the synthesizing part 211. Thus, only the signal elements of the OFDM signals arriving from a desired direction are synthesized, and other delayed wave components, interference wave components, etc. can be suppressed.

The output from the synthesizing part 211 is detected by the detecting part 213, and demodulated by the demodulating part 214 into a digital signal sequence (bit sequence).

Thus, uniform control of an antenna directivity can be performed on all frequency components in the band of broadband arriving waves. As a result, an OFDM signal can be received with a very little multipath interference, or Co-channel interference.

On the other hand, while a transmitting process is performed, the modulating part 215 receives a digital signal sequence (bit sequence), and modulates the OFDM subcarriers. The modulated OFDM transmitting signal is equally distributed into each antenna element by the distributing part 212, and supplied to the transmitting excitation weight assigning part 210.

The transmitting excitation weight calculating part 28 calculates a transmitting excitation weight based on the receiving excitation weight calculated by the receiving excitation weight calculating part 27. The OFDM transmitting signal is assigned a transmitting excitation weight by the transmitting excitation weight assigning part 210.

The OFDM transmitting signal from the transmitting excitation weight assigning part 210 is supplied to the second transforming part 26, and converted into a time waveform in the inverse Fourier transform. The transmitting part 24 performs a guard adding process and a DA converting process on the OFDM transmitting signal. Furthermore it performs a frequency converting process, an amplifying process, a band limiting process and the like on the signal, and supplies it in space from the antenna element 21 through the duplexer or RF switch 22. Thus, according to the present embodiment, an OFDM signal wave can be successfully transmitted and received without disturbance of multipath, fading, and/or interference waves of Co-channel interference in the radio propagation environment.

Figure 3:
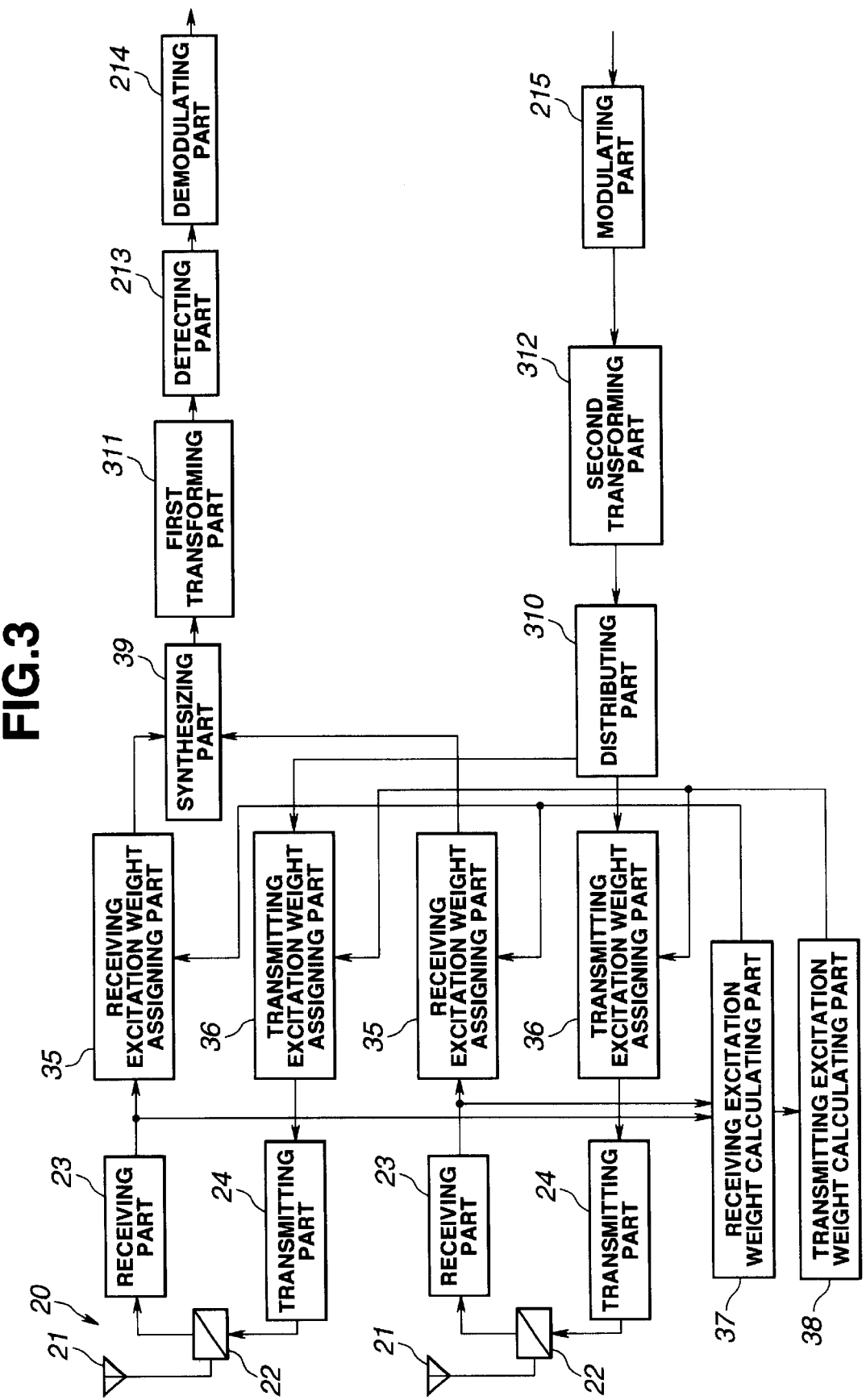
FIG. 3 is a block diagram showing a further embodiment of the present invention.

FIG. 3 is a block diagram showing another embodiment of the present invention. In FIG. 3, the components also shown in FIG. 2 are assigned the same reference numbers, and the detailed explanation is omitted here. According to the present embodiment, an excitation weight is assigned to an OFDM transmitting/receiving signal in the form of a time waveform (time axis). In the present embodiment, the number of antenna elements is not limited to 2, but can be equal to or larger than 2.

According to the present embodiment, the output from the receiving part 23 is supplied to a receiving excitation weight calculating part 37 and a receiving excitation weight assigning part 35. The receiving excitation weight calculating part 37 calculates a receiving excitation weight based on the distance between the plurality of antenna elements having identical characteristics depending on the radio frequency and the frequency intervals of OFDM subcarriers, and supplies the result to the receiving excitation weight assigning part 35 corresponding to each antenna element 21.

The calculated excitation weight is used for control of excitation for each antenna element and each receiving OFDM subcarrier. According to the present embodiment, the excitation weight is assigned in the form of a time waveform. Therefore, the receiving excitation weight calculated by the receiving excitation weight calculating part 37 corresponds to a time waveform.

The receiving excitation weight assigning part 35 assigns a receiving excitation weight to an OFDM receiving signal, and supplies it to a synthesizing part 39. The synthesizing part 39 synthesizes an output from the receiving excitation weight assigning part 35. Thus, the signal element (such as delayed wave component and interference wave component) other than an OFDM signal arriving from a desired direction can be successfully suppressed.

The output from the synthesizing part 39 is supplied to a first transforming part 311. The first transforming part 311 is the same in configuration as the first transforming part 25 shown in FIG. 2, and converts an input OFDM receiving signal into a frequency spectrum signal. The output from the first transforming part 311 is supplied to the detecting part 213.

On the other hand, in the transmitting system, the output from the modulating part 215 is supplied to a second transforming part 312. The second transforming part 312 is the same in configuration as the second transforming part 26 in FIG. 2, converts the input OFDM transmitting signal into a time waveform, and supplies it to a distributing part 310. The distributing part 310 equally distributes the input OFDM transmitting signal to each antenna element 21, and supplies the signal to the transmitting excitation weight assigning part 36.

A transmitting excitation weight calculating part 38 calculates the transmitting excitation weight from the output of the receiving excitation weight calculating part 37. When the transmitting excitation weight calculating part 38 employs a time division multiplexing (TDD) system, the transmitting excitation weight to be output is equal to the receiving excitation weight. The transmitting excitation weight calculating part 38 employs a frequency division (FDD) system to calculate, as a transmitting excitation weight, the result obtained by performing a correcting process on the receiving excitation weight based on the difference between the receiving radio frequency and the transmitting radio frequency.

The transmitting excitation weight assigning part 36 assigns the transmitting excitation weight to the time waveform signal from the distributing part 310, and supplies it to the transmitting part 24. Other configuration is the same as in FIG. 2.

The operation of the embodiment is described below,

In the receiving process, the receiving part 23 supplies the time waveform based on the output of each antenna element 21 to the receiving excitation weight calculating part 37 and the receiving excitation weight assigning part 35. Based on the input time waveform, the receiving excitation weight calculating part 37 calculates the receiving excitation weight which can be obtained based on the distance between antenna elements and the frequency intervals of the OFDM subcarriers.

Using the OFDM signal, the phase difference of the receiving waveforms received by antenna elements can be detected based on, for example, a reference waveform which is transmitted at a predetermined timing. For example, the receiving excitation weight calculating part 37 can calculate a receiving excitation weight based on the phase difference. The calculated receiving excitation weight corresponds to the time waveform.

The OFDM receiving signal from the receiving part 23 is assigned a receiving excitation weight by the receiving excitation weight assigning part 35. The OFDM receiving signal is synthesized by the synthesizing part 39, and converted by the first transforming part 311 into a frequency spectrum signal.

The output from the first transforming part 311 is detected by the detecting part 213, and demodulated by the demodulating part 214 into a digital signal sequence (bit sequence).

In the transmitting process, the digital signal sequence is supplied to the modulating part 215, and the OFDM subcarrier is modulated. The OFDM transmitting signal from the modulating part 215 is converted into a time waveform by the second transforming part 312. In this case, the OFDM signal specific guard is added.

The OFDM transmitting signal from the second transforming part 312 is equally distributed for each antenna element and supplied to the transmitting excitation weight assigning part 36. The transmitting excitation weight assigning part 36 assigns the transmitting excitation weight from the transmitting excitation weight calculating part 38 for the OFDM transmitting signal and supplies the result to the transmitting part 24.

After the transmitting part 24 performs a predetermined transmitting process on the OFDM transmitting signal assigned the transmitting excitation weight, the OFDM transmitting signal is supplied to the antenna element 21 through the duplexer or RF switch 22, and transmitted in space.

Thus, according to the present embodiment, the effect obtained in the embodiment shown in FIG. 2 can also be obtained. According to the embodiment shown in FIG. 2, a first transforming part is provided for each antenna element. However, according to the present embodiment, only one first transforming part is required, thereby reducing the size of the entire circuit.

Figure 4:
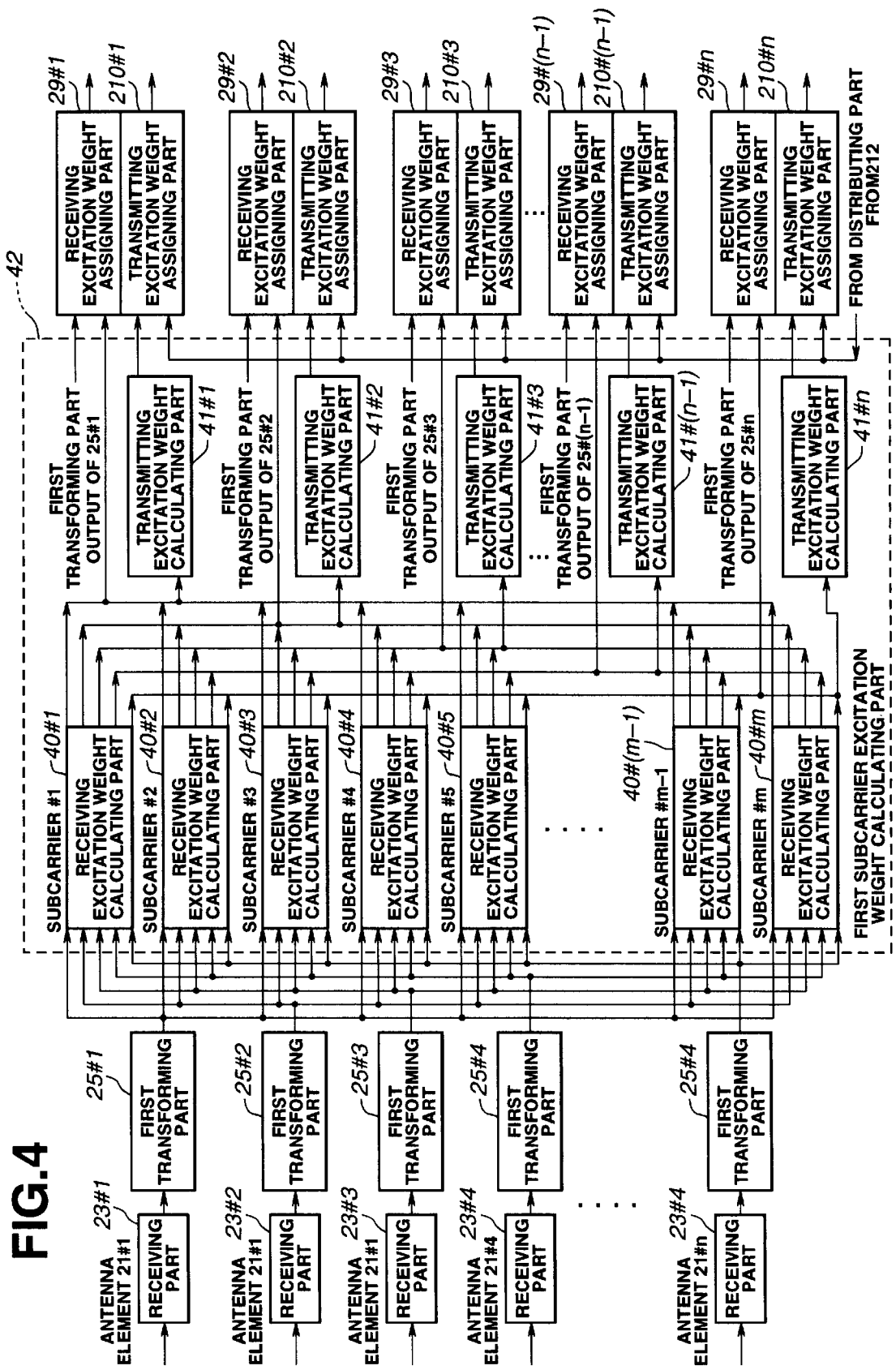
FIG. 4 is a block diagram showing a further embodiment of the present invention.

FIG. 4 is a block diagram showing another embodiment of the present invention. In FIG. 4, the components also shown in FIG. 2 are assigned the same reference numbers, and the detailed explanation is omitted here. The present embodiment is a practical example of a method for calculating an excitation weight in the embodiment shown in FIG. 2. In FIG. 4, only a part of the receiving system and the transmitting system is shown, and a plurality of antenna elements having the identical characteristics, duplexer or RF switch 2, etc. are omitted. The present embodiment is an example of using n antenna elements 21#1 through 21#n having the identical characteristics. In FIG. 4, n pieces of wire are not shown in FIG. 4 for simple expression.

In FIG. 4, receiving signals from n antenna elements 21#1 through 21#n are supplied to receiving parts 23#1 through 23#n respectively. The receiving parts 23#1 through 23#n have the same configuration as the receiving part 23 shown in FIG. 2, and the OFDM signal of the base band is output to each of the first transforming parts 25#1 through 25#n.

The first transforming parts 25#1 through 25#n are similar in configuration to the first transforming part 25 shown in FIG. 2, convert the OFDM signal into a frequency spectrum signal, output the signal to receiving excitation weight assigning parts 29#1 through 29#n, and also output it to the excitation weight calculating parts 42. It is assumed that the number of subcarriers of the OFDM signal is m. The receiving excitation weight assigning parts 29#1 through 29#n are similar in configuration to the receiving excitation weight assigning part 29 shown in FIG. 2, assign the receiving excitation weight to the frequency spectrum signal, and output the resultant signal.

According to the present embodiment, the receiving excitation weight and the transmitting excitation weight are generated by a first subcarrier excitation weight calculating parts 42. The first subcarrier excitation weight calculating parts 42 has the function of the receiving excitation weight calculating part 27 and the transmitting excitation weight calculating part 28 shown in FIG. 2.

The first subcarrier excitation weight calculating parts 42 comprises receiving excitation weight calculating parts 40#1 through 40#m and transmitting excitation weight calculating parts 41#1 through 41#n. The frequency spectrum signals of the same subcarrier from the first transforming parts 25#1 through 25#n are supplied to a receiving excitation weight calculating part for the corresponding subcarrier. The receiving excitation weight calculating parts 40#1 through 40#m are given the output of each subcarrier by the first transforming parts 25#1 through 25#n, and generate the receiving excitation weight for excitation of the subcarriers #1 through #m. The receiving excitation weights for respective subcarriers #1 through #m are grouped for each antenna element, and supplied to the transmitting excitation weight calculating parts 41#1 through 41#n and the receiving excitation weight assigning parts 29#1 through 29#n corresponding to respective antennas.

The transmitting excitation weight calculating parts 41#1 through 41#n calculates, using each receiving excitation weight for the calculated subcarriers #1 through #m, the transmitting excitation weights for each antenna element and each of the subcarriers #1 through #m, and output the calculation result to the transmitting excitation weight assigning parts 210#1 through 210#n corresponding to each antenna element. The configuration of the transmitting excitation weight assigning parts 210#1 through 210#n is similar to the transmitting excitation weight assigning part 210 shown in FIG. 2, and is designed to assign a transmitting excitation weight to the OFDM transmitting signal from the distributing part not shown in the drawings.

Figures 5A, 5B:
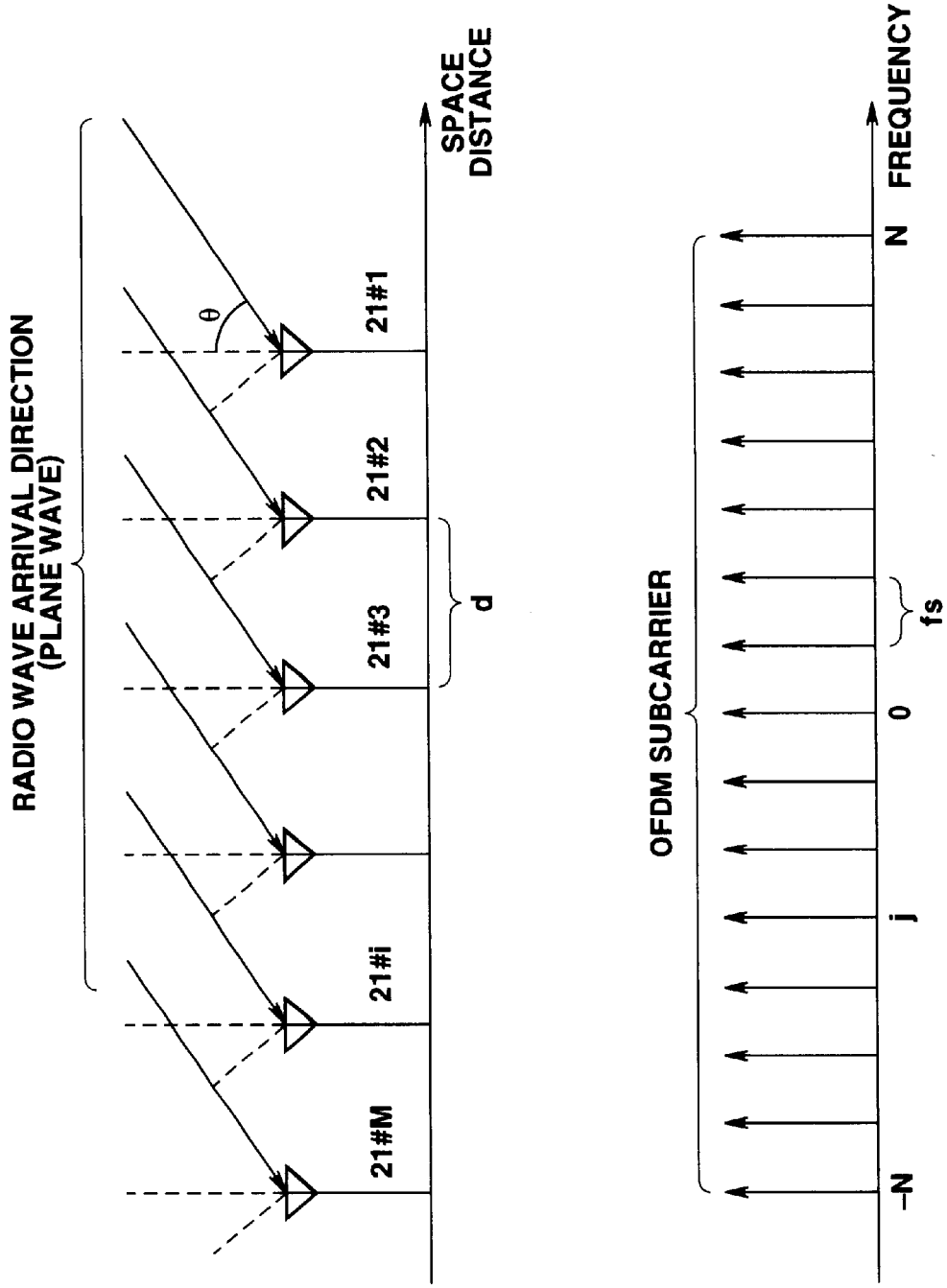
FIGS. 5A and 5B show a method of calculating the excitation weight.

Then, the operation of the embodiment with the above described configuration is described below by referring to FIGS. 5A and 5B. FIGS. 5A and 5B show the calculation of the receiving/transmitting excitation weight. FIG. 5A shows the array of antenna elements. FIG. 5B show OFDM subcarriers.

The OFDM receiving signals received by the n antenna elements 21#1 through 21#n having identical characteristic are supplied to the receiving parts 23#1 through 23#n respectively. The receiving parts 23#1 through 23#n convert the OFDM receiving signals into base band digital signals. The output from the receiving parts 23#1 through 23#n is supplied to the first transforming parts 25#1 through 25#n respectively, and converted into a frequency spectrum signal.

The frequency spectrum signals of the subcarrier #1 from the first transforming parts 25#1 through 25#n are supplied to the receiving excitation weight calculating part 40#1. Similarly, the frequency spectrum signals of the subcarriers #2 through #m from the first transforming parts 25#1 through 25#n are supplied to the receiving excitation weight calculating parts 40#2 through 40#m respectively.

FIGS. 5A and 5B show the calculation of an excitation weight. FIG. 5A shows the state of a plurality of antenna elements having identical characteristic arranged at element intervals d. This antenna is normally referred to an M element interval linear array antenna.

In FIG. 5A, considering the propagation delay (distance and time) between adjacent antenna elements based on the antenna element 21#1, the propagation delay distance l is obtained by the following equation (1).

$$l = d \sin \theta \tag{1}$$

Assuming that the OFDM signal arrives as a plane wave, the propagation delay time between the adjacent antenna elements is represented by the following equation (2).

$$\tau = l/c \tag{2}$$

where c is light velocity. Therefore, the relative delay time $\tau i$ at the antenna element 21#i to the antenna element 21#1 is (i−1) times the value obtained by the equation (2). Therefore, the j-th subcarrier signal received by the antenna element 21#i with the receiving frequency fR (Hz) can be represented as follows.

$$r_{i,j}(t) = \alpha_{i,j} e^{j2\pi(f_R+f_j)\{t-(i-1)l/c\}} \quad (3)$$

The result (equation (4)) obtained by converting the subcarrier signal of the equation (3) into a frequency is input to the receiving excitation weight calculating part shown in FIG. 4.

$$r_{i,j}(t) = \alpha_{i,j} e^{j2\pi f_j\{t-(i-1)l/c\}} e^{-j2\pi f_R(i-1)l/c} \quad (4)$$

To obtain a gain by receiving and synthesizing the j-th subcarrier using all antenna elements, the propagation delay time should be corrected. That is, the receiving excitation weight $w_{i,j}$ for the j-th subcarrier of the antenna element 21#i is represented by the following equation (5).

$$w_{i,j} = \alpha^*_{i,j} e^{j2\pi(f_R+f_j)(i-1)l/c} \quad (5)$$

The receiving excitation weight $w_{i,j}$ represented by the equation (5) is described as follows using the receiving frequency fR and the arrival angle θ.

$$w_{i,j} = \alpha^*_{i,j} e^{j2\pi(f_R+f_j)(i-1)\frac{\sin\theta}{kf_R}} \quad (6)$$

where d=λ/k. λ indicates the wavelength of a receiving frequency.

As shown by the equation (6), the optimum receiving excitation weight of the antenna element 21#1 depends on the receiving frequency fR and the subcarrier frequency fj. Thus, to appropriately transmit and receive an OFDM signal using the adaptive variable directional antenna, the transmitting/receiving excitation weight should be calculated based on the antenna element interval d and the OFDM subcarrier frequency interval. Normally, since the OFDM subcarriers are arranged at uniform intervals, fj of the above described equations (1) through (6) can be represented by the following equation (7) where fs is the subcarrier interval as shown in FIG. 5B.

$$f_j = j \times f_s \quad (7)$$

In FIG. 4, the receiving excitation weight calculating parts 40#1 through 40#m calculates the receiving excitation weight $w_{i,j}$ obtained by the equation (6) above. The receiving excitation weights obtained by the receiving excitation weight calculating parts 40#1 through 40#m are grouped for each antenna element, and supplied to the receiving excitation weight assigning parts 29#1 through 29#n. The receiving excitation weight assigning parts 29#1 through 29#n assign the receiving excitation weights of the corresponding subcarrier to the frequency spectrum signals from the first transforming parts 25#1 through 25#n, and output the results. Other operations in the receiving system are the same as in FIG. 2.

On the other hand, in the transmitting system, the receiving excitation weights calculated by the receiving excitation weight calculating parts 40#1 through 40#m are input to the transmitting excitation weight calculating parts 41#1 through 41#n, and a correcting process is performed on them according to a predetermined access system.

When the transmitting and receiving operations are performed by the time division multiplexing (TDD) system, the transmitting excitation weight calculating parts 41#1 through 41#n output the output of the receiving excitation weight calculating parts 40#1 through 40#m as is because the transmitting excitation weight is the same as the receiving excitation weight. When the transmitting and receiving operations are performed by the frequency division multiplexing (FDD) system, the transmitting excitation weight calculating parts 41#1 through 41#m output as the transmitting excitation weights the results obtained by performing a correcting process on the receiving excitation weights based on the difference between the receiving radio frequency and the transmission radio frequency.

That is, when the transmitting frequency fT is different from the receiving frequency fR, the equation (6) above should be varied into the following equation (8).

$$w_{i,j} = \alpha^*_{i,j} e^{j2\pi(f_R+f_j)(i-1)\frac{\sin\theta}{kf_R} \cdot \frac{f_T}{f_R}} \quad (8)$$

The transmitting excitation weight calculating parts 41#1 through 41#n generate the transmitting excitation weights described in the equation (8), and output them to the transmitting excitation weight assigning parts 210#1 through 210#n. The transmitting excitation weight assigning parts 210#1 through 210#n assign the transmitting excitation weights to the OFDM transmitting signals from the distributing part (not shown). Other operations are similar to those according to the embodiment shown in FIG. 2.

Thus, according to the present invention, the arrival direction of the OFDM signal is predicted for each subcarrier (line spectrum) by taking advantage of the OFDM signal comprising a subcarrier (line spectrum). As a result, even in the radio propagation environment in which interference waves of multipath, fading, Co-channel interference, etc., a broadband OFDM signal wave can be transmitted and received in space without being affected by these interference waves. That is, the uniform control of an antenna array can be performed in all frequency components in the band of the OFDM transmitting/receiving signal.

The equation (6) above indicates the receiving excitation weight calculated based on the j-th subcarrier. Assuming that the weight is also used for the frequency subcarrier of fj'=fj+δf, the vector error Δ can be represented by the following equation (9).

$$\Delta = e^{-j2\pi\delta f(i-1)\frac{\sin\theta}{kf_R}} \quad (9)$$

When the fj subcarrier is an object in the calculation of the receiving excitation weight, then δf =0, therefore, Δ=0. That is, the subcarrier other than fj cannot realize the synthesization at the maximum ratio, and the arrival wave from the θ direction is attenuated when received (no antenna gain). The calculation of the attenuation is shown in FIG. 11. The communication system shown in FIG. 11 assumes the radio frequency of 5 (GHz), and the band width of 40 (MHz). Furthermore, the broadcasting system assumes the radio frequency of 100 (MHz), and the band width of 8 (MHz).

FIG. 6 is a block diagram showing another embodiment of the present invention. In FIG. 6, the components also shown in FIG. 4 are assigned the same reference numbers, and the detailed explanation is omitted here. According to the present embodiment, the calculation of the excitation weight is different from the embodiment shown in FIG. 4. That is, the present embodiment employs an excitation weight calculating part 60 in place of the first subcarrier excitation weight calculating parts 42 shown in FIG. 4.

The excitation weight calculating part 60 comprises a first reference excitation weight calculating part 61 and a second subcarrier excitation weight calculating part 62. The first reference excitation weight calculating part 61 is supplied with a frequency spectrum signal of a predetermined subcarrier #j in the output from the first transforming parts 25#1 through 25#n.

The first reference excitation weight calculating part 61 calculates the receiving excitation weight of the subcarrier #j in each antenna element. The receiving excitation weight is supplied as a reference excitation weight to a subcarrier receiving excitation weight calculating part 63 and a subcarrier transmitting excitation weight calculating part 64 of the second subcarrier excitation weight calculating part 62.

The subcarrier receiving excitation weight calculating part 63 corrects the reference excitation weight based on the subcarrier intervals, and calculates the receiving excitation weight of each subcarrier of the OFDM signal received by each antenna element. The subcarrier transmitting excitation weight calculating part 64 corrects the reference excitation weight based on the subcarrier intervals and the difference between the transmitting excitation weights, and calculates the transmitting excitation weight of each subcarrier of the OFDM signal transmitted by each antenna element.

The calculation result of the subcarrier receiving excitation weight calculating part 63 is supplied to the receiving excitation weight assigning parts 29#1 through 29#n, and the receiving excitation weight is assigned to the frequency spectrum signal which is a conversion result of the first transforming parts 25#1 through 25#n. The calculation result of the subcarrier transmitting excitation weight calculating part 64 is supplied to the transmitting excitation weight assigning parts 210#1 through 210#n, and the transmitting excitation weight is assigned to a transmitting OFDM signal frequency spectrum signal.

Then, the operation of the embodiment with the above described configuration is described below.

As in the embodiment shown in FIG. 4, a frequency spectrum signal is obtained from the first transforming parts 25#1 through 25#n. According to the present embodiment, only the frequency spectrum signal having the j-th subcarrier in the first through m-th subcarriers from the first transforming parts 25#1 through 25#n is supplied to the first reference excitation weight calculating part 61.

The first reference excitation weight calculating part 61 calculates the excitation weight of the j-th subcarrier from the frequency spectrum signal of the input j-th subcarrier, and supplies the result to the second subcarrier excitation weight calculating part 62 as a reference excitation weight.

The subcarrier receiving excitation weight calculating part 63 of the second subcarrier excitation weight calculating part 62 corrects the reference excitation weight based on the subcarrier intervals, and calculates the receiving excitation weight of each subcarrier of the OFDM signal received by each antenna element.

The subcarrier transmitting excitation weight calculating part 64 corrects the reference excitation weight based on the subcarrier intervals and the difference between the transmitting frequency and the receiving frequency, and calculates the transmitting excitation weight of each subcarrier of the OFDM signal transmitted through each antenna element. The calculation processes and results obtained by the subcarrier receiving excitation weight calculating part 63 and the subcarrier transmitting excitation weight calculating part 64 are similar to those obtained by the equations (1) through (8) above.

Thus calculated receiving excitation weights and transmitting excitation weights are respectively supplied to the receiving excitation weight assigning parts 29#1 through 29#n and the transmitting excitation weight assigning parts 210#1 through 210#n.

Other operations are similar to those according to the embodiment shown in FIG. 4.

Thus, according to the present embodiment, the effect similar to that obtained according to the embodiment shown in FIG. 4 can be successfully obtained.

Figure 7:
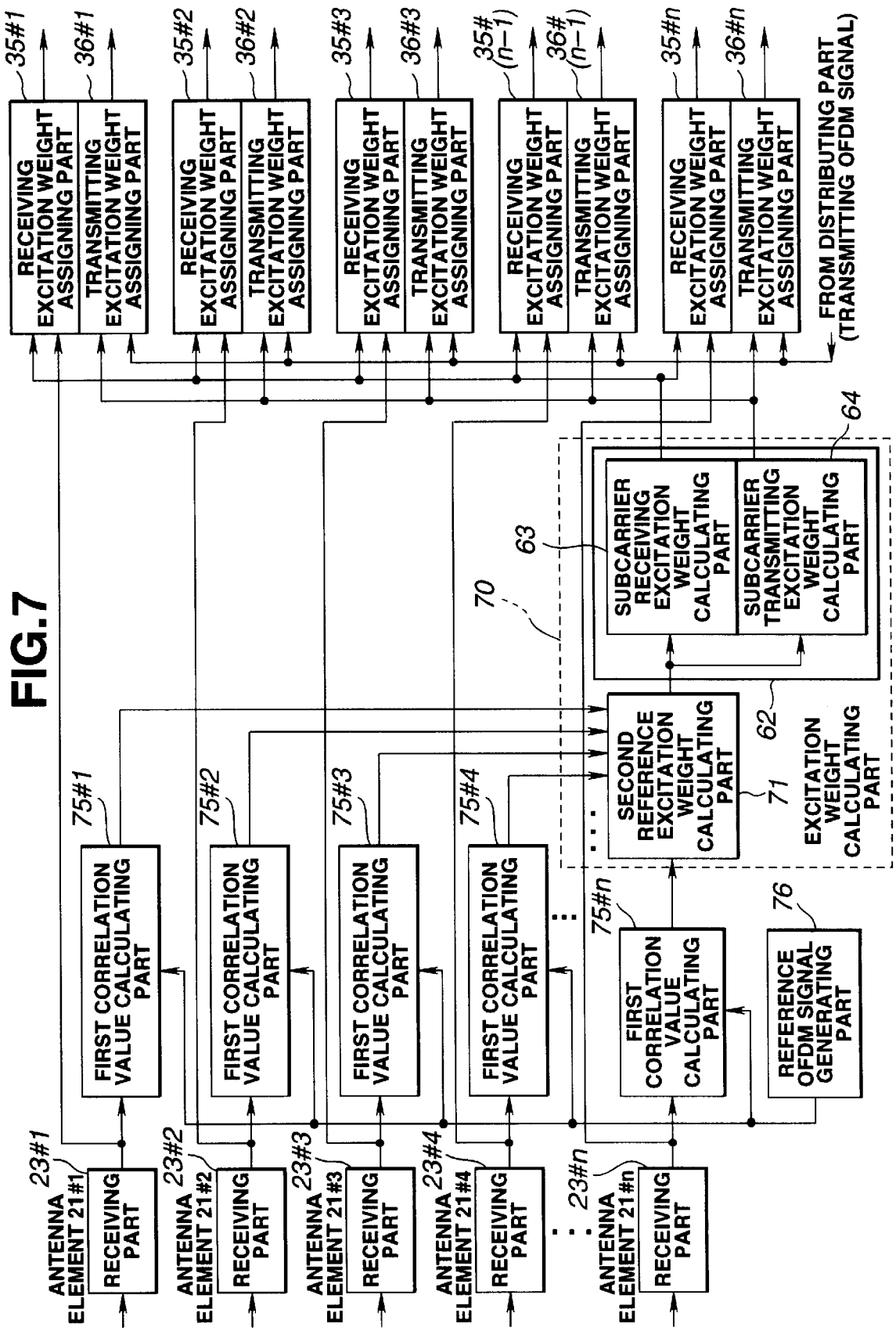
FIG. 7 is a block diagram showing a further embodiment of the present invention.

FIG. 7 is a block diagram showing another embodiment of the present invention. In FIG. 7, the components also shown in FIGS. 3 and 6 are assigned the same reference numbers, and the detailed explanation is omitted here. The present embodiment is an example of a practical method of calculating the excitation weight according to the embodiment shown in FIG. 3. In FIG. 7, only a part of the receiving system and the transmitting system is shown, and a plurality of antenna elements, duplexer, RF switch, etc. having identical characteristics are omitted here. The present embodiment is also an example of using n antenna elements 21#1 through 21#n having identical characteristics (not shown). In addition, the wire of each unit is not shown as n pieces for simplicity in FIG. 7.

In FIG. 7, the output (time waveform) of the receiving parts 23#1 through 23#n is supplied as is respectively to receiving excitation weight assigning parts 35#1 through 35#n and first correlation value calculating parts 75#1 through 75#n.

A reference OFDM signal generating part 76 generates a reference OFDM signal having the same waveform as the reference OFDM signal inserted in the OFDM signal at a predetermined timing, and supplies it to the first correlation value calculating parts 75#1 through 75#n. The first correlation value calculating parts 75#1 through 75#n obtain the correlation value between the time waveform from the receiving parts 23#1 through 23#n and the reference OFDM signal, and output it to an excitation weight calculating part 70.

The excitation weight calculating part 70 comprises a second reference excitation weight calculating part 71 and the second subcarrier excitation weight calculating part 62. The correlation value input to the second reference excitation weight calculating part 71 corresponds to the phase difference among the receiving waveforms received by the antenna elements 21#1 through 21#n. The second reference excitation weight calculating part 71 calculates the reference excitation weight at a predetermined center frequency. The reference excitation weight is supplied to the second subcarrier excitation weight calculating part 62.

Since the reference excitation weight corresponds to the receiving excitation weight of the average frequency (center frequency) of the OFDM receiving signal, the second subcarrier excitation weight calculating part 62 calculates the excitation weight of each subcarrier of the received OFDM signal from the reference excitation weight, and calculates the excitation weight of the subcarrier of the transmitting OFDM signal.

The receiving excitation weight from the second subcarrier excitation weight calculating part 62 is supplied to the receiving excitation weight assigning parts 35#1 through 35#n, and the transmitting Ad excitation weight is supplied to the transmitting excitation weight assigning parts 36#1 through 36#n. The receiving excitation weight assigning parts 35#1 through 35#n is similar to the receiving excitation weight assigning part 35 shown in FIG. 3 in configuration, and assigns the receiving excitation weight to the time axis signal for output. In addition, the configuration of the transmitting excitation weight assigning parts 36#1 through 36#n is similar to that of the transmitting excitation weight assigning part 36 shown in FIG. 3, and assigns the transmitting excitation weight to the OFDM transmitting signal from the distributing part not shown in the attached drawings.

The output of the receiving excitation weight assigning parts 35#1 through 35#n is supplied to the first transforming part through a synthesizing part not shown in the attached drawings, and converted into a frequency spectrum signal.

The operation according to the embodiment with the configuration above is described as follows.

As in the embodiment shown in FIG. 3, an OFDM signal of a base band is obtained from the receiving parts 23#1 through 23#n. According to the present embodiment, the time waveform from the receiving parts 23#1 through 23#n is supplied to the receiving excitation weight assigning parts 35#1 through 35#n.

The time waveform from the receiving parts 23#1 through 23#n is also supplied to the first correlation value calculating parts 75#1 through 75#n. The reference OFDM signal is also input to the first correlation value calculating parts 75#1 through 75#n. The first correlation value as calculating parts 75#1 through 75#n obtain the correlation value between the time waveform from the receiving parts 23#1 through 23#n and the reference OFDM signal, and output the result to the second reference excitation weight calculating part 71.

The correlation value indicates a phase error at a predetermined center frequency, and the second reference excitation weight calculating part 71 obtains the reference excitation weight based on the correlation value corresponding to each antenna element. The reference excitation weight corresponds to the receiving excitation weight of the average frequency (center frequency) of the OFDM receiving signal.

As in the embodiment shown in FIG. 6, the reference excitation weight is supplied to the second subcarrier excitation weight calculating part 62. The receiving excitation weight and the transmitting excitation weight for each antenna element are then calculated.

The receiving excitation weight assigning parts 35#1 through 35#n assign the receiving excitation weight to the time waveform from the receiving parts 23#1 through 23#n for output. In addition, the transmitting excitation weight assigning parts 36#1 through 36#n assign the transmitting excitation weight to the transmitting OFDM signal from the distributing part for output. Other operations are similar to those according to the embodiments shown in FIGS. 3 and 6.

Thus, according to the present embodiment, the effect obtained according to the embodiment shown in FIGS. 3 and 6 can also be obtained.

Figure 8:
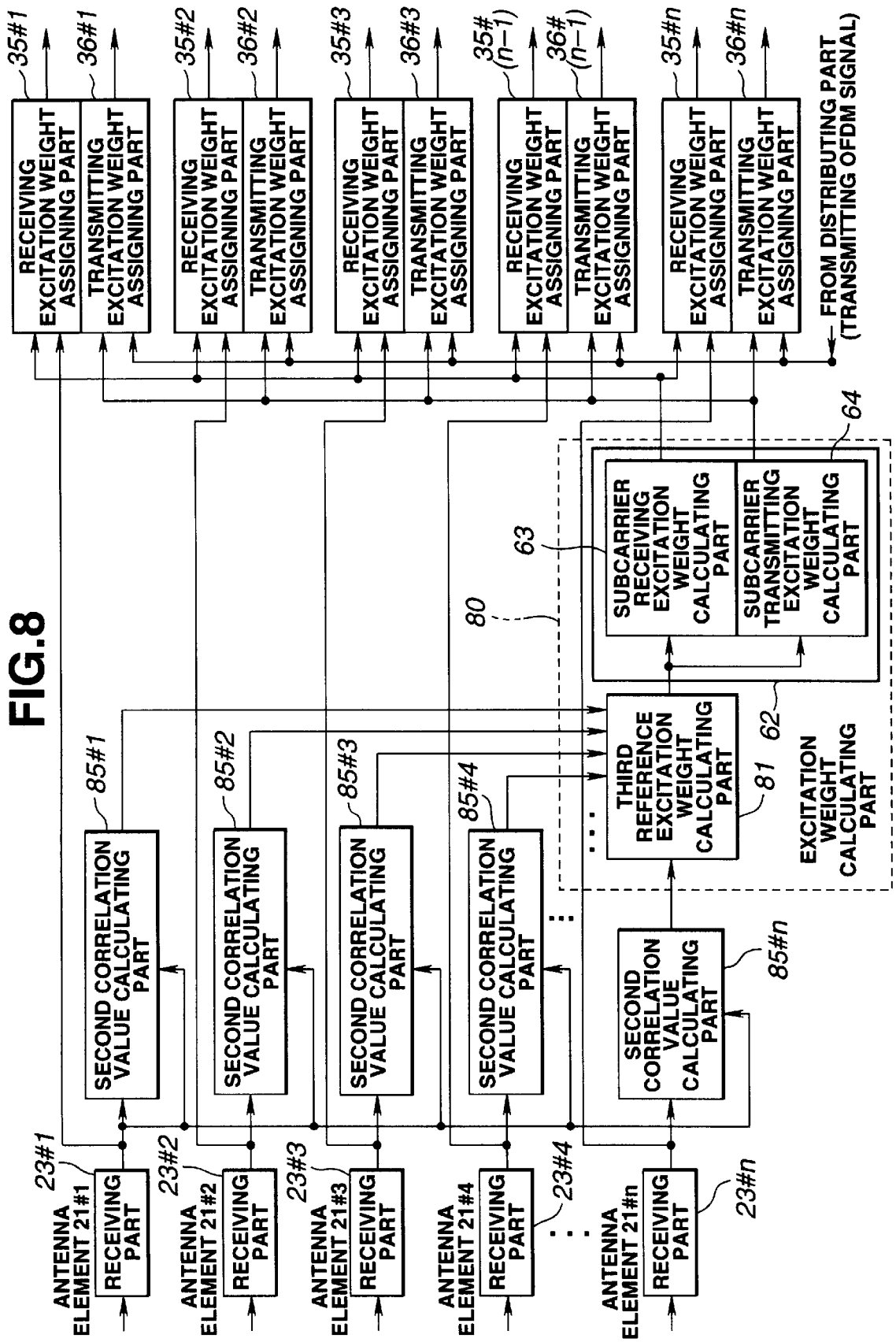
FIG. 8 is a block diagram showing a further embodiment of the present invention.

FIG. 8 is a block diagram showing a further embodiment of the present invention. In FIG. 8, the components also shown in FIG. 7 are assigned the same reference numbers, and the detailed explanation is omitted here. The present embodiment is an example in which the reference OFDM signal generating part is omitted.

The present embodiment is different in the following points from the embodiment shown in FIG. 7. That is, a reference OFDM signal generating part 76 is omitted, and second correlation value calculating parts 85#1 through 85#n respectively replace the first correlation value calculating parts 75#1 through 75#n. In addition, an excitation weight calculating part 80 having a third reference excitation weight calculating part 81 replaces the second reference excitation weight calculating part 71.

The output from the receiving parts 23#1 through 23#n and the output from the receiving part 23#1 are supplied to the second correlation value calculating parts 85#1 through 85#n respectively. The second correlation value calculating parts 85#1 through 85#n obtains the correlation between the output from the receiving part 23#1 corresponding to the antenna element 21#1 and the output from the receiving parts 23#1 through 23#n corresponding to the antenna elements 21#1 through 21#n respectively. In this case, the correlation value from the second correlation value calculating parts 85#1 through 85#n is based on the phase difference of the receiving signal received by each antenna element.

The third reference excitation weight calculating part 81 obtains the reference excitation weight corresponding to a predetermined center frequency of the received OFDM signal based on the correlation value from the second correlation value calculating parts 85#1 through 85#n, and supplies the result to the second subcarrier excitation weight calculating part 62.

Described below is an operation according to the embodiment with the configuration above.

The OFDM receiving signal of the base band from the receiving parts 23#1 through 23#n is supplied to the second correlation value calculating parts 85#1 through 85#n. The second correlation value calculating parts 85#1 through 85#n calculates the correlation value between the output from the receiving parts 23#1 through 23#n and the output from the receiving part 23#1. The correlation value is supplied to the third reference excitation weight calculating part 81, and the reference excitation weight is obtained.

The reference excitation weight obtained by the third reference excitation weight calculating part 81 corresponds to the receiving excitation weight of the average frequency (center frequency) of the OFDM receiving signal. The reference excitation weight is supplied to the second subcarrier excitation weight calculating part 62 to obtain the receiving excitation weight and the transmitting excitation weight.

Other operations are the same as in the embodiment shown in FIG. 7.

According to the present embodiment, the effect obtained according to the embodiment shown in FIG. 7 can also be obtained in the present invention. In addition, the reference OFDM signal generating part is omitted, thereby reducing the scale of the circuit.

Figure 9:
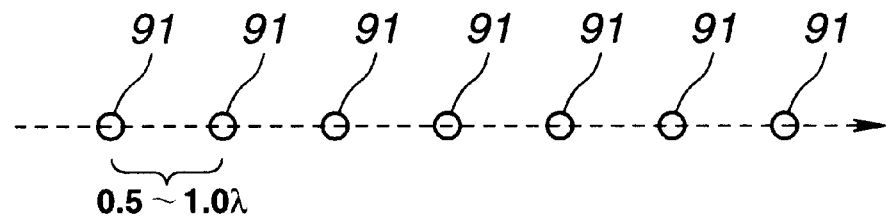
FIG. 9 shows an array of antenna elements.
Figure 10:
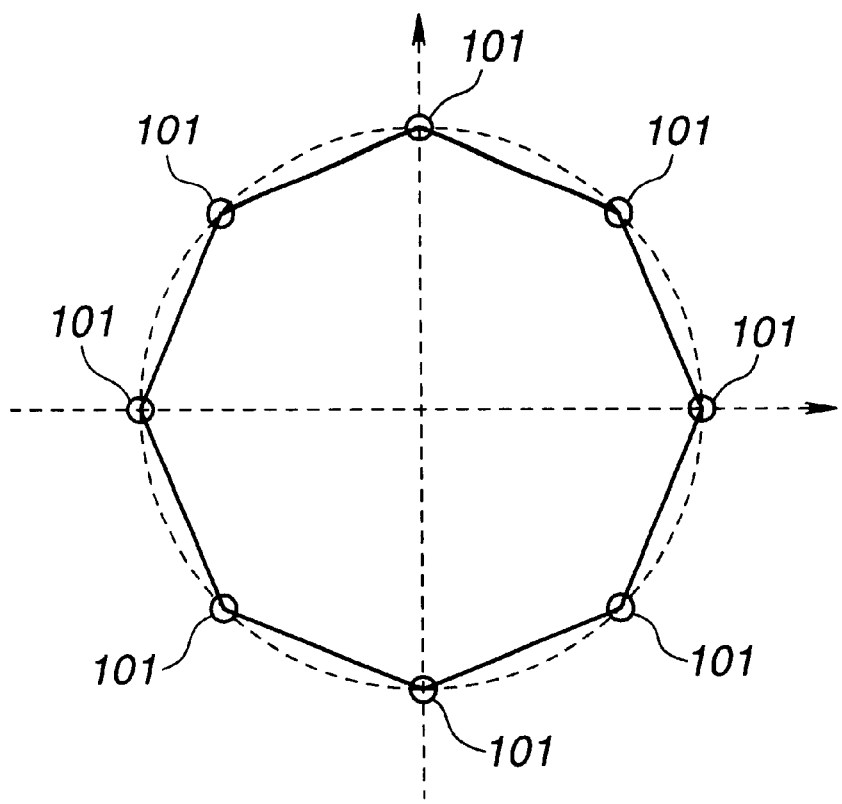
FIG. 10 shows an array of antenna elements.

FIGS. 9 and 10 show the antenna part of an adaptive variable directional antenna according to the present invention.

FIG. 9 is a top view of the linear array in which a plurality of antenna elements having the same characteristics are arranged in a linear array. A plurality of antenna elements 91 having identical characteristics are arranged at equal element intervals of 0.5 $\lambda$ through 1.0 $\lambda$ ($\lambda$ indicates a wavelength). With the arrangement, uniform control over the antenna array can be realized.

FIG. 10 is a top view of a plurality of antenna elements 101 having identical characteristics which are arranged in a circular array or a polygonal array. The plurality of antenna elements 101 having identical characteristics are arranged at equal element intervals of 0.5 $\lambda$ through 1.0 $\lambda$. With the arrangement, uniform control over the antenna array can be realize.

According to the present invention, variations of embodiments can be designed in a wide range without deviation from the concept and scope of the invention. The present invention is only limited by the attached claims, but not limited by specific aspects of embodiments.

What is claimed is:

1. An adaptive variable directional antenna, comprising:
a plurality of antenna elements having identical characteristics which transmit and receive an orthogonal frequency division multiplexing (OFDM) signal;
excitation weight calculating unit which calculates an excitation weight for use in excitation controlling said plurality of antenna elements for each antenna element and each subcarrier based on element intervals of said plurality of antenna elements and frequency intervals of subcarriers of the OFDM signal; and
excitation weight assigning unit which assigns the excitation weight calculated by said excitation weight calculating unit to the OFDM signal received by said plurality of antenna elements or to the OFDM signal transmitted through said plurality of antenna elements.

2. An adaptive variable directional antenna according to claim 1,
wherein said excitation weight calculating unit calculates the excitation weight to be assigned to the OFDM signal of a time waveform;
said excitation weight assigning unit assigns the calculated excitation weight to the OFDM signal of the time waveform.

3. An adaptive variable directional antenna according to claim 1,
wherein said excitation weight calculating unit calculates an excitation weight to be assigned to the OFDM signal of a frequency spectrum;
said excitation weight assigning unit assigns the calculated excitation weight to the OFDM signal of the frequency spectrum.

4. An adaptive variable directional antenna according to claim 1,
wherein said excitation weight calculating unit comprises a first subcarrier excitation weight calculating unit which calculates an excitation weight for each subcarrier of the OFDM receiving signal received by said plurality of antenna elements.

5. An adaptive variable directional antenna according to claim 1, wherein said excitation weight calculating unit comprises:
first reference excitation weight calculating unit which calculates a reference excitation weight using at least one subcarrier of the subcarriers of OFDM receiving signals received by said plurality of antenna elements; and
second subcarrier excitation weight calculating unit which calculates an excitation weight for each subcarrier of a transmitted/received OFDM signal based on the reference excitation weight calculated by said first reference excitation weight calculating unit.

6. An adaptive variable directional antenna according to claim 1, wherein said excitation weight calculating unit comprises:
first correlation value calculating unit which calculates a correlation value between an OFDM signal received by said plurality of antenna elements and a reference OFDM signal corresponding to the OFDM signal;
second reference excitation weight calculating unit which calculates a reference excitation weight using the correlation value output from said first correlation value calculating unit; and
third subcarrier excitation weight calculating unit which calculates an excitation weight of a subcarrier of a transmitted/received OFDM signal based on the reference excitation weight calculated by said second reference excitation weight calculating unit.

7. An adaptive variable directional antenna according to claim 1, wherein said excitation weight calculating unit comprises:
second correlation value calculating unit which calculates a correlation value between an OFDM receiving signal received by a predetermined reference antenna element of said plurality of antenna elements and an OFDM receiving signal received by an antenna element other than the reference antenna element;
third reference excitation weight calculating unit which calculates a reference excitation weight using the correlation value output from said second correlation value calculating unit; and
fourth subcarrier excitation weight calculating unit which calculates an excitation weight of a subcarrier of a transmitted/received OFDM signal based on the reference excitation weight calculated by said third reference excitation weight calculating unit.

8. An adaptive variable directional antenna according to claim 1,
wherein said plurality of antenna elements are arranged at equal intervals in a linear array.

9. An adaptive variable directional antenna according to claim 1,
wherein said plurality of antenna elements are arranged at equal intervals in a circular or polygonal array.

10. An adaptive variable directional antenna according to claim 1,
wherein said excitation weight calculating unit calculates a receiving excitation weight to be assigned to a received OFDM signal based on an OFDM signal received by said plurality of antenna elements, and calculates a transmitting excitation weight to be assigned to a transmitting signal by correcting the calculated receiving excitation weight using a frequency difference between the received OFDM signal and the transmitting OFDM signal.

11. An adaptive variable directional antenna, comprising:
a plurality of antenna elements having identical characteristics for transmitting and receiving an orthogonal frequency division multiplexing(OFDM) signal;
means for calculating an excitation weight for use in excitation controlling said plurality of antenna elements for each antenna element and each subcarrier based on element intervals of said plurality of antenna elements and frequency intervals of subcarriers of the OFDM signal; and
means for assigning the excitation weight calculated by said means for calculating the excitation weight to the OFDM signal received by said plurality of antenna elements or to the OFDM signal transmitted through said plurality of antenna elements.

12. A radio communication method, comprising:
providing a plurality of antenna elements having identical characteristics for transmitting and receiving an orthogonal frequency division multiplexing(OFDM) signal;
calculating an excitation weight for use in excitation controlling the plurality of antenna elements for each antenna element and each subcarrier based on element intervals of the plurality of antenna elements and frequency intervals of subcarriers of the OFDM signal; and assigning the excitation weight calculated by the calculating step to the OFDM signal received by the plurality of antenna elements or to the OFDM signal transmitted through said plurality of antenna elements.

13. The method according to claim 12, further comprising:

calculating the excitation weight to be assigned to the OFDM signal of a time waveform; and assigning the calculated excitation weight to the OFDM signal of the time waveform.

14. The method according to claim 12, further comprising:

calculating an excitation weight to be assigned to the OFDM signal of a frequency spectrum; and assigning the calculated excitation weight to the OFDM signal of the frequency spectrum.

15. The method according to claim 12, further comprising:

calculating an excitation weight for each subcarrier of the OFDM receiving signal received by the plurality of antenna elements.

16. The method according to claim 12, further comprising:

calculating a reference excitation weight using at least one subcarrier of the subcarriers of OFDM receiving signals received by the plurality of antenna elements; and calculating an excitation weight for each subcarrier of a transmitted/received OFDM signal based on the reference excitation weight calculated in the calculating a reference excitation weight step.

17. The method according to claim 12, further comprising:

calculating a correlation value between an OFDM signal received by said plurality of antenna elements and a reference OFDM signal corresponding to the OFDM signal;

calculating a reference excitation weight using the correlation value; and calculating an excitation weight of a subcarrier of a transmitted/received OFDM signal based on the calculated reference excitation weight.

18. The method according to claim 12, further comprising:

calculating a correlation value between an OFDM receiving signal received by a first reference antenna element of the plurality of antenna elements and an OFDM receiving signal received by a second antenna element;

calculating a reference excitation weight using the correlation value; and calculating an excitation weight of a subcarrier of a transmitted/received OFDM signal based on the calculated reference excitation weight.

19. The method according to claim 12, further comprising:

arranging the plurality of antenna elements at equal intervals in a linear array.

20. The method according to claim 12, further comprising:

arranging the plurality of antenna elements at equal intervals in a circular or polygonal array.

21. The method according to claim 12, further comprising:

calculating a receiving excitation weight to be assigned to a received OFDM signal based on an OFDM signal received by the plurality of antenna elements; and calculating a transmitting excitation weight to be assigned to a transmitting signal by correcting the calculated receiving excitation weight using a frequency difference between the received OFDM signal and the transmitting OFDM signal.

* * * * *